(12) United States Patent
Okamoto

(10) Patent No.: US 7,268,465 B2
(45) Date of Patent: Sep. 11, 2007

(54) DRIVING DEVICE AND OPTICAL DEVICE USING THE SAME

(75) Inventor: Yasuhiro Okamoto, Tondabayashi (JP)

(73) Assignee: Konica Minolta OPTO, Inc. (JP)

( * ) Notice: Subject to any disclaimer, the term of this patent is extended or adjusted under 35 U.S.C. 154(b) by 0 days.

(21) Appl. No.: 11/269,946

(22) Filed: Nov. 9, 2005

(65) Prior Publication Data

US 2006/0103266 A1    May 18, 2006

(30) Foreign Application Priority Data

Nov. 12, 2004 (JP) ............................ 2004-328375

(51) Int. Cl.
*H01L 41/08* (2006.01)
(52) U.S. Cl. .................. 310/323.02; 310/328
(58) Field of Classification Search ........... 310/323.02, 310/323.03, 323.05, 323.07
See application file for complete search history.

(56) References Cited

U.S. PATENT DOCUMENTS 5,892,317 A * 4/1999 Mukohjima et al. ... 310/323.03
6,384,493 B1   5/2002 Okamoto
6,727,635 B2 * 4/2004 Okamoto et al. ...... 310/316.01

FOREIGN PATENT DOCUMENTS

JP   2001-060113   3/2001

* cited by examiner

*Primary Examiner*—Mark Budd
(74) *Attorney, Agent, or Firm*—Brinks Hofer Gilson & Lione; Eric D. Cohen

(57) ABSTRACT

A driving device according to the present invention includes an electromechanical transducer secured at its one end to a stationary body, a driving frictional member secured to the other end of the electromechanical transducer, and a moving body which frictionally engage with the driving frictional member. The moving body has a length smaller than the total length of the stationary body, the electromechanical transducer 5 and the driving frictional member. The moving body moves such that it extends beyond the lengthwise end portions of the driving frictional member.

20 Claims, 6 Drawing Sheets

DRIVING DEVICE AND OPTICAL DEVICE USING THE SAME

The present application claims priority to Japanese Patent Application No. 2004-328375 filed on Nov. 12, 2004, the entire content of which is hereby incorporated by reference.

BACKGROUND OF THE INVENTION

1. Field of the Invention

The present invention relates to a driving device using an electromechanical transducer. Further, the present invention relates to an optical device for driving an optical component (a lens or the like) using the driving device.

2. Description of the Related Art

As described in JP-A No. 2001-60113, there have been well known driving devices of device-fixing types and free-running types, as driving devices utilizing electromechanical transducers. As illustrated in FIG. 1, a conventional device-fixing type driving device 21 is constituted by an electromechanical transducer (piezoelectric device) 23 secured to a stationary body 22 at its one end, a driving frictional member 24 secured to the other end of the electromechanical transducer 23 to move forwardly and backwardly in the longitudinal direction through the expansion and contraction of the electromechanical transducer 23 and a moving body 25 which frictionally engages with the driving frictional member 24. The driving device 21 causes the electromechanical transducer 23 to expand and contract at different speeds such that the driving frictional member 24 is slowly moved in a single direction to move the moving body 25 together with the driving frictional member 24 through the frictional engagement therebetween while the driving frictional member 24 is rapidly moved in the opposite direction to slide the moving body 25 with respect to the driving frictional member 24 through the inertia of the moving body 25. The conventional device-fixing type driving device 21 repeatedly performs the operation to continuously move the moving body 25 within the range of the length of the driving frictional member 24.

Further, U.S. Pat. No. 6,384,493 discloses a free-running type driving device having a basic configuration similar to that described in JP-A No. 2001-60113. As illustrated in FIG. 2, a conventional free-running type driving device 31 is constituted by a stationary member 32, a driving frictional member 33 which frictionally engages with the stationary member 32, an electromechanical transducer 34 secured to one end of the driving frictional member 33 and a moving body 35 secured to the other end of the electromechanical transducer 34. The driving device 31 causes the electromechanical transducer 34 to slowly expand and contract so as to maintain the frictional engagement between the driving frictional member 33 and the stationary member 32 for moving the moving body 35. Also, the driving device 31 causes the electromechanical transducer 34 to rapidly contract and expand to slide the driving frictional member 33 with respect to the stationary member 32 through the inertia of the moving body 35. The conventional free-running type driving device 31 repeatedly performs the operation to continuously move the moving body 35 within the range of the length of the stationary body.

In recent years, in order to drive optical components and the like of optical devices which have been advanced in miniaturization, there have been needs for small-sized driving devices with reduced overall lengths. However, with the conventional device-fixing type driving device 21, the moving body 25 is moved within the range of the length of the driving frictional member 24 by frictionally engaging the moving body 25 with the driving frictional member 24, which requires the driving frictional member 24 to have a length corresponding to the overall length of the moving body 25 plus the stroke of the moving body 25. In addition, in order to enable smoothly moving the long-and-thin driving frictional member 24 forwardly and backwardly in the longitudinal direction, the driving frictional member 24 is also required to have a length for providing bearings 26 and 27. Further, since the electromechanical transducer 23 is secured to one end of the driving frictional member 24, the conventional device-fixing type driving device 21 has the problem that the overall length thereof is greater in comparison with the stroke of the moving body 15.

Also, with the conventional free-running type driving device 31, the electromechanical transducer 34 is moved together with the moving body 35, which requires flexible wiring for supplying a driving voltage to the electromechanical transducer 34. In the case of realizing a significantly-small-sized free-running driving device 31, if the wiring is provided using a common flexible substrate, this can not provide sufficient flexibility, which hinders the movement of the moving body 35, thus inducing the problem of impossibility of stable driving.

FIG. 3 simply illustrates the configuration of the device-fixing type driving device 21 of FIG. 1. In the driving device 21, the driving frictional member 24 is secured to the electromechanical transducer 23 and the electromechanical transducer 23 is secured to the stationary body 22 using adhesives 28 and 29, respectively. In fabrication processes for the miniaturized driving device 21, it is difficult in practical to accurately apply necessary minimum amounts of adhesives 28 and 29 so as to spread them only within the bonding surfaces between the driving frictional surface 24 and the electromechanical transducer 23 and between the electromechanical transducer 23 and the stationary body 22. As illustrated in the figure, it is unavoidable that the adhesives 28 and 29 squeezed out from the bonding surfaces form protrusions on the side surfaces of the driving frictional member 24 and the electromechanical transducer 23. Consequently, the conventional device-fixing type driving device 21 causes the problem that the driving frictional member 24 should have a further greater length by an expected amount of protrusion a of the adhesive 29.

SUMMARY OF THE INVENTION

It is a principal object of the present invention to provide a driving device with a small overall length.

It is another object of the present invention to provide a compact-type optical device.

In order to overcome the aforementioned and other objects, a driving device according to an aspect of the present invention includes:

an electromechanical transducer secured at its one end to a stationary body;

a driving frictional member secured to the other end of the electromechanical transducer; and a moving body which can frictionally engage with said driving frictional member such that it extends beyond the lengthwise end portions of the driving frictional member, the moving body having a length smaller than the total length of the stationary body, the electromechanical transducer and the driving frictional member.

Further, according to another aspect of the present invention, an optical device includes:

a moving body having frictional surfaces with a length greater than the distance by which it is movable;

a barrel which is movable integrally with the moving body while holding an optical component;

a driving frictional member which frictionally engages with a portion of the frictional surfaces; and an electromechanical transducer which is secured to one end of the driving frictional member and secured, at its other end, to a stationary body.

The driving device according to the present invention is suitable for driving image pickup units such as cameras, pickups of disk devices and miniaturized optical systems such as endoscopes.

The invention itself, together with further objects and attendant advantages, will best be understood by reference to the following detailed description.

BRIEF DESCRIPTION OF THE DRAWINGS

In the following description, like parts are designated by like reference numbers throughout the several drawings.

DETAILED DESCRIPTION OF THE PREFERRED EMBODIMENT

Hereinafter, embodiments of the present invention will be described with reference to the drawings.

Figure 1:
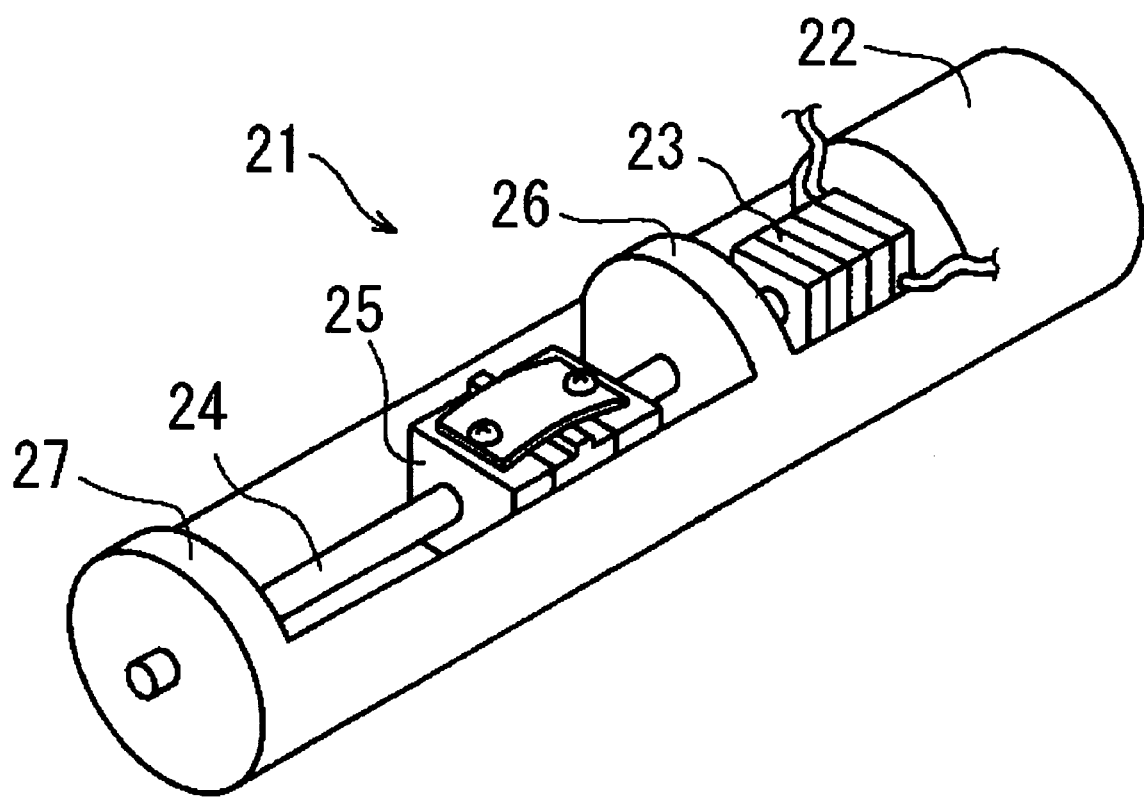
FIG. 1 is a perspective view of a conventional device-fixing type driving device.
Figure 2:
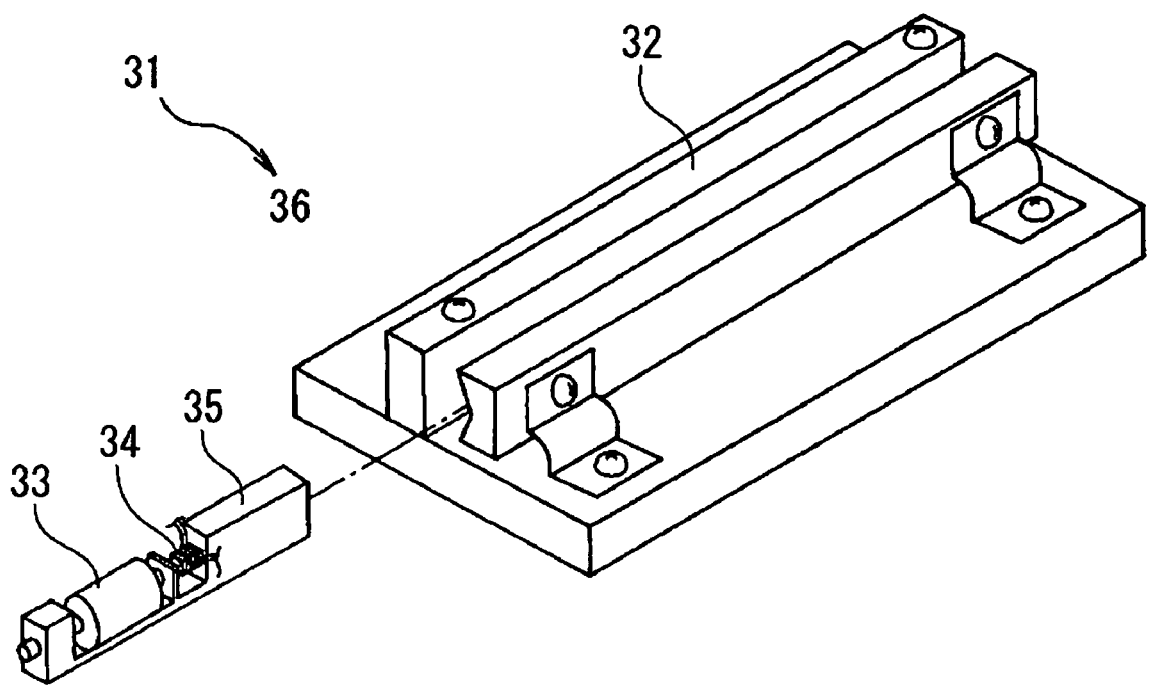
FIG. 2 is a perspective view of a conventional free-running type driving device.
Figure 3:
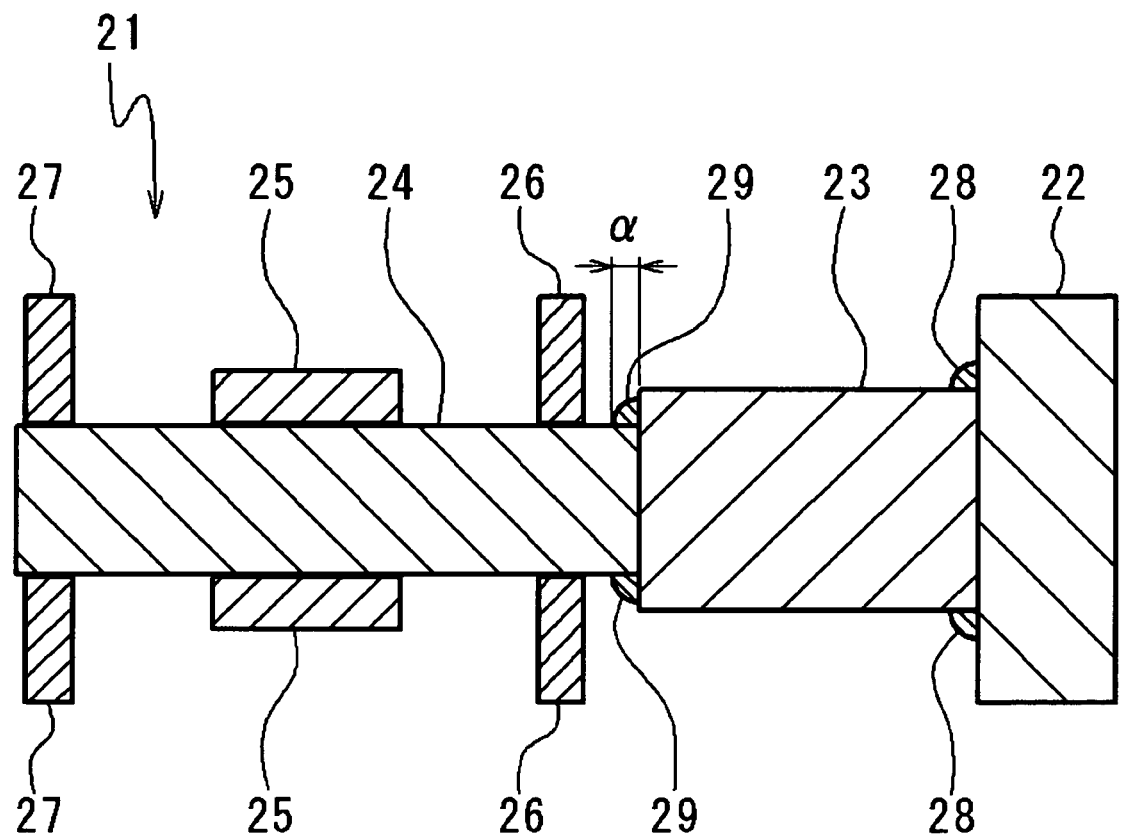
FIG. 3 is a cross-sectional view of the driving device of FIG. 1.
Figure 4:
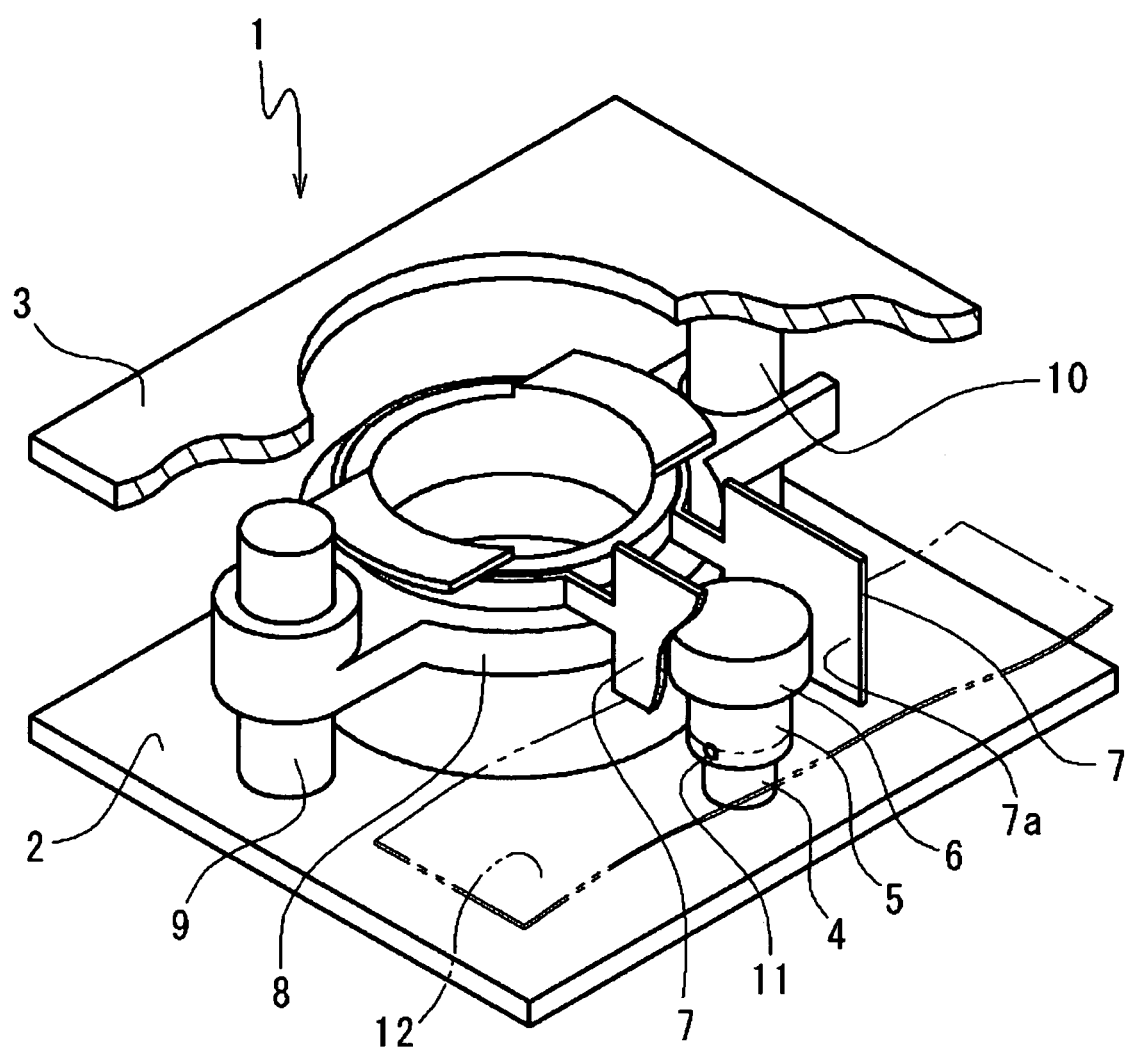
FIG. 4 is a perspective view of a driving device according to a first embodiment of the present invention.

FIG. 4 illustrates a driving device 1 according to a first embodiment of the present invention. The driving device 1 is configured between a first frame 2 and a second frame 3. The driving device 1 is constituted by a stationary body 4 which is a cylindrical-shaped weight, an electromechanical transducer 5 which is secured to the upper portion of the stationary body 4 and formed from a cylindrical-shaped piezoelectric device with a diameter greater than that of the stationary body 4, a driving frictional member 5 which is secured to the upper end of electromechanical transducer 5 and is made of a ceramic material having a diameter greater than that of the electromechanical transducer 5, a moving body 7 which is formed from a metal spring and engaged with the driving frictional member 6 at their opposing frictional surfaces 7a sandwiching the driving frictional member 6 therebetween such that the moving body 7 extends beyond the driving frictional member 6, a lens barrel 8 which is movable integrally with the moving body 7 in the vertical direction while securing a lens, and a first hanging shaft 9 and a second hanging shaft 10 which guide the lens barrel 8 in the vertical direction. Further, the electromechanical transducer 5 is supplied, at their electrodes 11, with a driving voltage, through a flexible substrate 12 which is formed from a thin resin film and metal wiring provided thereon.

Figure 5:
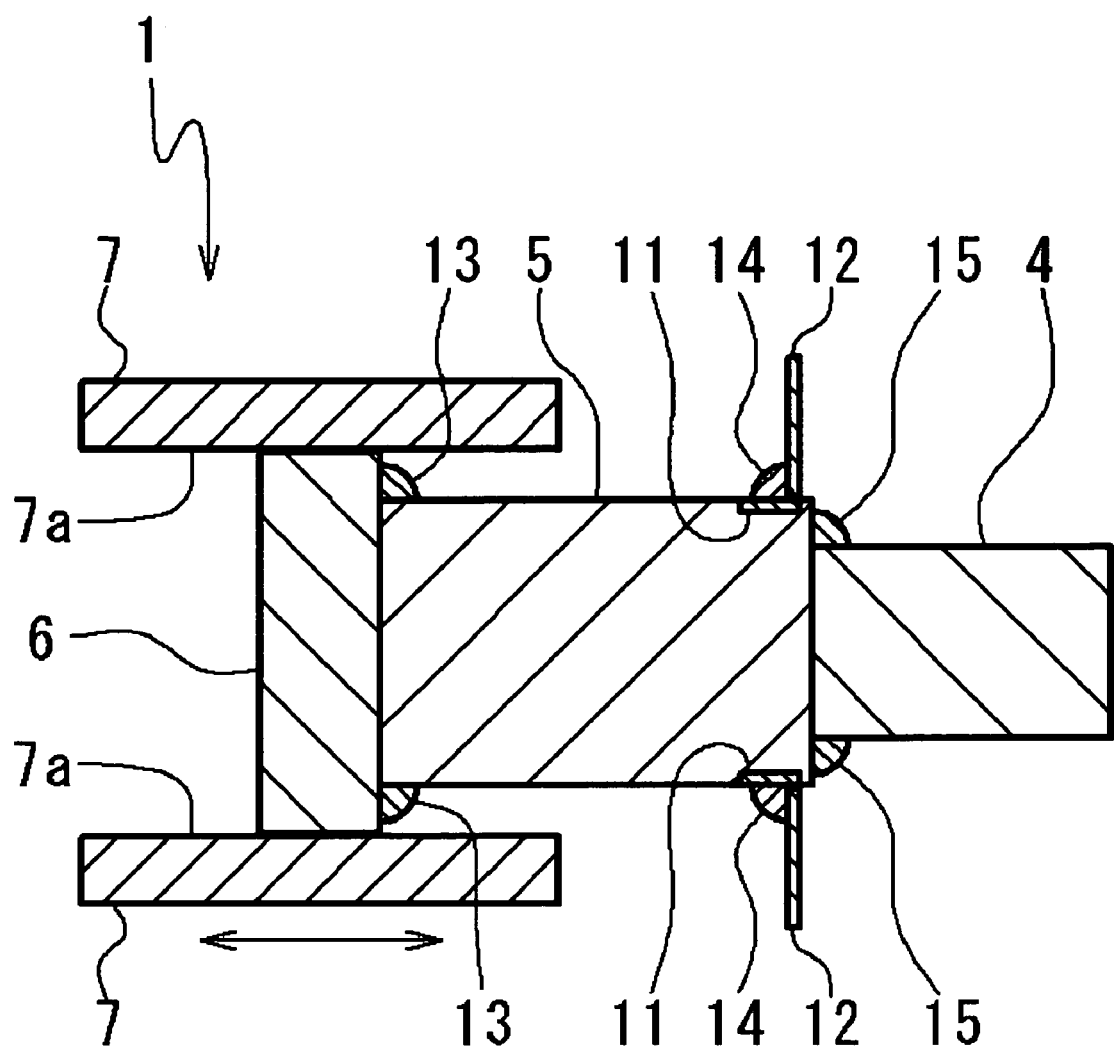
FIG. 5 is a cross-sectional view of the driving device of FIG. 4.

Further, FIG. 5 illustrates the configuration of the driving device 1. In the figure, an arrow represents the direction in which the moving body 7 can be moved. The moving body 7 sandwiches the driving frictional member 6 at their opposing frictional surfaces 7a with a length sufficiently greater than the driving frictional member 6 in the direction in which it is movable. The driving frictional member 6 has an overall length smaller than the overall length of the electromechanical transducer 5 while the moving body 7 has an overall length smaller than the total length of the electromechanical transducer 5 and the driving frictional member 6.

Further, the portion of the driving frictional member 6 which engages with the moving body 7 has a thickness (a diameter since the driving frictional member 6 has a cylindrical shape, in the present embodiment) greater than the sum of the thickness (the diameter in the present embodiment) of the electromechanical transducer 5 and the thickness of the protruded portion of non-conductive adhesive 13 securing the electromechanical transducer 5 to the driving frictional member 6, which prevents the electromechanical transducer 5 and the non-conductive adhesive 13 from abutting the moving body 7. The electromechanical transducer 5 is inserted through a hole formed through the flexible substrate 12 with a diameter substantially in agreement with the outer diameter of the electromechanical transducer 5 and the metal wiring on the flexible substrate 12 is bonded to the electrical electrodes 11 through conductive-adhesive 14, so that the electromechanical transducer 5 can be supplied, at their electrodes 11, with a driving voltage. Further, the electromechanical transducer 5 has a thickness (diameter) greater than the sum of the thicknesses (the diameters) of the stationary body 4 and the protruded portion of non-conductive adhesive 15 securing the stationary body 4 to the electromechanical transducer 5.

Subsequently, there will be described the operation of the driving device 1 having the aforementioned configuration.

In the driving device 1 of FIG. 5, the electromechanical transducer 5 expands and contracts in the vertical direction, by being supplied, between the two electrodes 11, with a displacement voltage from the flexible substrate 12. Since the electromechanical transducer 5 is secured at its one end to the stationary body 4 having a large mass, the electromechanical transducer 5 expands or contracts in the direction parallel to the hanging shafts 9 and 10 such that the end portion thereof adjacent to the stationary body 4 can not move while the end portion secured to the driving frictional member 6 moves together with the driving frictional member 6. When the driving frictional member 6 is moved under small acceleration, the moving body 7 sandwiching and engaging the driving frictional member 6 at its opposing frictional surfaces 7a through frictional force is moved along the hanging shafts 9 and 10 while maintaining the frictional engagement with the driving frictional member 6. However, when the driving frictional member 6 is moved under great acceleration, the inertia of the moving body 7 and the lens barrel 8 induces a force which causes them to remain at the current position which is greater than the frictional force between the moving body 7 and the driving frictional member 6, which causes only the driving frictional member 6 to slide and move on the frictional surfaces 7a of the moving body 7. It is possible to change the expansion speed (acceleration rate) and the contraction speed (acceleration rate) of the electromechanical transducer 5 through the waveform of the displacement voltage applied to the electromechanical transducer 5. In such a manner, the driving frictional member 6 is moved in a single direction while maintaining the frictional engagement with the moving body 7 and is slid and moved on the frictional surfaces 7a of the moving body 7 in the opposite direction. The driving device 1 can repeatedly generate such reciprocating movement of the driving frictional member 6 for causing the moving body 7 to move in an arbitrary single direction along the hanging shafts 9 and 10.

The moving body 7 is movable over the range in which the moving body 7 engages with the overall length of the driving frictional member 6. The distance (stroke) by which the moving body 7 can move is the length of the frictional surfaces 7a minus the length of the driving frictional member 6. Since the moving body 7 has an overall length sufficiently smaller than the total length of the driving frictional member 6 and the electromechanical transducer 5, even if the moving body 7 is maximally moved towards the electromechanical transducer 5, namely if the moving body 7 is frictionally engaged with the driving frictional member 6 at its end portion opposite from the electromechanical transducer 5, the moving body 7 will not interfere with the flexible substrate 12. By providing wiring to the electromechanical transducer 5 along the stationary body 4, it is possible to expand the length of the moving body to a length slightly smaller than the total length of the driving frictional member 6, the electromechanical transducer 5 and the stationary body 4, thus further increasing the stroke of the moving body 7. As described above, with the driving device 1, the electrical-to-mechanical device 5 can be placed such that it overlaps with the range of movement of the moving body 7, which enables reduction of the overall length. Also, the moving body 7 may be configured to move to a position at which the moving body 7 frictionally engages with a portion of the length of the driving frictional member 6, which may further increase the stroke or decrease the length of the moving body 7 for the same stroke. However, this will vary the frictional force between the moving body 7 and the driving frictional member 6 and, therefore, attentions should be paid on the voltage waveform and the like.

Figure 6:
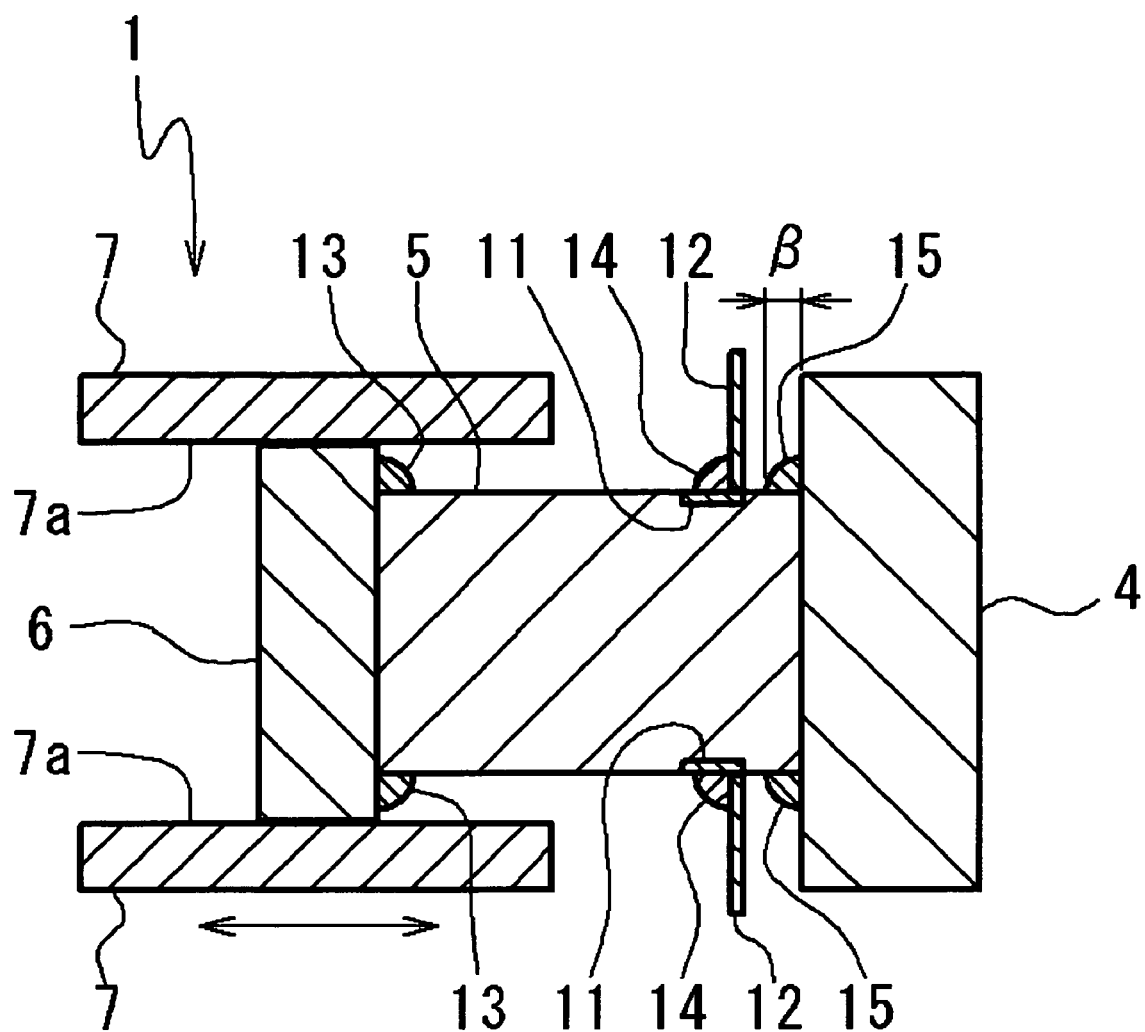
FIG. 6 is a cross-sectional view of a driving device according to a second embodiment of the present invention.

As a driving device 1 according to a second embodiment illustrated in FIG. 6, it is possible to employ a stationary body 4 with a diameter (the thickness in the direction along which the moving body 7 engages with the driving frictional member 6) greater than that of the electromechanical transducer 5. However, in this case, the non-conductive adhesive 15 for securing the stationary body 4 to the electromechanical transducer 5 is protruded on the surface of the electromechanical transducer 5, which may cause the position of the flexible substrate 12 to be closer to the driving frictional member 6 by the length β of the protrusion, thus resulting in reduction of the stroke of the moving body 7. Therefore, it is preferable that the stationary body 4 has a diameter (a thickness in the direction along which the moving body 7 engages with the driving frictional member 6) smaller than the diameter (the thickness in the direction along which the moving body 7 engages with the driving frictional member 6) of the electromechanical transducer 5, as in the first embodiment of FIG. 5, since this can prevent the non-conductive adhesive 15 from protruding on the cylindrical surface of the electromechanical transducer 5 and also can prevent the danger of interference of the moving body 7 with the flexible substrate 12 or the conductive adhesive 14.

Since, in the driving device 1, the driving frictional member 6 and the electromechanical transducer 5 have significantly small lengths, the driving frictional member 6 can be stably moved in the direction of movement of the moving body 7 even though there is provided no guide along the direction of expansion/contraction of he electromechanical transducer 5 as a bearing. Further, in the case where a member such as the lens barrel 8 which is greater than the electromechanical transducer 5 and the driving frictional member 6 or the moving body 7 as in the driving device 1, it is common to provide guide members such as the hanging shafts 9 and 10, in order to enable smoothly moving the lens barrel 8 in a predetermined direction. As a result, the hanging shafts 9 and 10 function as guide members for moving the moving body 7 in the predetermined direction, thus ensuring stable driving of the driving device 1. Further, since the driving frictional member 6 of the driving device 1 has a small overall length and a small mass, it is possible to realize stable operation even with a smaller driving force for the electromechanical transducer 5 and with the stationary body 4 having a small mass for stably securing one end of the electromechanical transducer 5. Further, since the driving frictional member 6 has a small overall length, by increasing the engaging width thereof to increase the area engaging with the frictional surfaces 7a without significantly increasing the mass (the frictional area may be also microscopically increased by increasing the diameter, in the present embodiment), it is possible to provide a stable frictional force, thus realizing a driving device with a small overall length and a high operation stability, even when the overall length of the driving frictional member 6 is reduced.

Further, in comparison with conventional driving devices, in the driving device 1 according to the present invention, the driving frictional member 6 has a high degree of flexibility in the mechanical characteristics such as Young's modulus. Namely, the driving frictional member 6 of the driving device 1 has a small overall length. Therefore, even if the driving frictional member 6 is made of a slightly elastic material, it can behave similarly to a substantially ideal rigid member and it is possible to prevent the occurrence of lag due to the elasticity of the driving frictional member 6 and the occurrence of changes in the amount of movement of the moving body 7 due to variations of the movement waveform of driving frictional member 6 depending on the engaging position of the moving body 7. Accordingly, the driving frictional member 6 according to the present invention may be made of an engineering plastic such as polyphenylene sulfide resin (PPS resin) or a liquid crystal polymer (LCP resin), a carbon reinforced resin or glass fiber reinforced resin. As a matter of course, the driving frictional member 6 may be made of a ceramic material or the like to reduce the mass and increase the rigidity, which enables the driving device 1 to perform driving with higher stability.

In the aforementioned embodiments, the moving body can frictionally engage with the driving frictional member such that it extends beyond the lengthwise end portions of the driving frictional member and also the moving body has a length smaller than the total length of the stationary body, the electromechanical transducer and the driving frictional member. With this configuration, since the moving body can move while extending beyond the driving frictional member, the moving body can move over a range greater than the overall length of the driving frictional member. Namely, it is possible to increase the stroke of the moving body with a driving frictional member with a smaller length. Further, since the moving body has a length smaller than the total length of the stationary body, the electromechanical transducer and the driving frictional member, the moving body will not interfere with the outer configuration of the stationary body at its tip end, even if the moving body is maximally moved toward the stationary body relative to the driving frictional member. Namely, the overall length of the moving body can contribute to the engagement with the driving frictional member, thus enabling reduction of the length of the entire driving device relative to the stroke of the moving body.

Further, the driving frictional member has a smaller length than that of the moving body. With this configuration, the moving body is driven through the driving frictional member having a smaller length, which reduces the influence from displacement of the driving frictional member in the direction of movement and prevents the occurrence of problems such as deformation due to the shortage of rigidity of the driving frictional member itself. This eliminates the necessity of providing a bearing for linearly moving the driving frictional member, thus enabling reduction of the overall length of the driving device. Preferably, the moving body has a length sufficiently greater than that of the driving frictional member to cause the overall length of the driving frictional member to frictionally engage with the moving member any time, which prevents the frictional force therebetween from varying depending on the position of the moving body, thus enabling stable driving.

Further, the driving frictional member has a smaller length than that of the electromechanical transducer. With this configuration, the driving frictional member has a smaller length, thus reducing the overall length of the driving device.

Further, the thickness of the driving frictional member in the direction along which it frictionally engages with the moving body is greater than the thickness of the electromechanical transducer. With this configuration, the moving body can protrude from the side of the driving frictional member which is secured to the electromechanical transducer, thus increasing the stroke of the moving body.

Further, the electromechanical transducer has a greater thickness than that of the stationary body. With this configuration, in providing wiring on the electromechanical transducer through a flexible substrate, the stationary body secured to the electromechanical transducer can be penetrated through a hole in the flexible substrate, thus facilitating provision of wiring on the electromechanical transducer.

Further, it is preferable that the driving frictional member is made of a ceramic material. With this configuration, the driving frictional member has a small weight and high rigidity. This can increase the driving efficiency since the inertia of the driving frictional member is reduced. Further, this can prevent efficiency reduction due to the elasticity of the driving frictional member.

In the aforementioned embodiments, there are provided guide members (hanging shafts 9, 10) for linearly moving the moving body. With this configuration, the guide members restrict the direction of movement of the moving body and, therefore, no forces act thereon in the lateral direction with respect to the direction of movement of the driving frictional member. This enables the driving device to operate with high stability.

Further, in the aforementioned embodiments, the driving device is constituted by a moving body having frictional surfaces with a length greater than the distance by which it is movable, a driving frictional member which engages with a portion of the frictional surfaces, and an electromechanical transducer which is secured to one end of the driving frictional member and secured at the other end to the stationary body.

With this configuration, in the driving device, the movable moving body is positioned through the driving frictional member having a smaller length, rather than moves on the driving frictional member as conventional. Thus, even though the driving frictional member has a smaller length and there is no bearing configuration, it is possible to provide stable operations. This enables reduction of the overall length of the driving device.

Further, the driving frictional member is kept frictionally-engaged with the moving body, over the entire length thereof. With this configuration, by maintaining the contact area between the driving frictional member and the moving body, it is possible to maintain the frictional force acting on the engagement therebetween constant, thus enabling stable driving.

While in the aforementioned embodiments the electromechanical transducer has a cylindrical shape, the shape of the electromechanical transducer is not limited to a cylindrical shape and may be, for example, a prism shape.

Further, while in the aforementioned embodiment the driving frictional member has a cylindrical shape, the shape of the driving frictional member is not limited to a cylindrical shape and may be, for example, a prism shape. In the case where the driving frictional member has a prism shape, the moving body is prevented from rotating around the driving frictional member, which enables elimination of the guiding members.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A driving device, comprising:
   an electromechanical transducer secured at its one end to a stationary body;
   a driving frictional member secured to the other end of said electromechanical transducer, the driving frictional member having opposite lengthwise end portions;
   a moving body which can frictionally engage said driving frictional member;
   the moving body having opposite end portions that extend in a direction of movement of the moving body, the opposite end portions extending beyond the lengthwise end portions of said driving frictional member, said moving body having a length smaller than the total length of the stationary body, said electromechanical transducer and said driving frictional member.

2. A driving device according to claim 1, wherein said driving friction member is shorter than said moving body.

3. A driving device according to claim 1, wherein said driving friction member is shorter than said electromechanical transducer.

4. A driving device according to claim 1, wherein the thickness in the direction along which said moving body engages with said driving frictional member is greater than the thickness of said electromechanical transducer.

5. A driving device according to claim 4, wherein the thickness of said electromechanical transducer is greater than that of said stationary body.

6. A driving device according to claim 1, wherein said driving frictional member is made a ceramic material.

7. A driving device according to claim 1, further comprising a guide member for linearly moving said moving body.

8. A driving device according to claim 1, wherein said moving body includes a spring for sandwiching said driving frictional member with an elastic force.

9. A driving device, comprising:
a moving body having frictional surfaces with a length greater than the distance by which it is movable;
a driving frictional member which frictionally engages with a portion of the frictional surfaces; and
an electromechanical transducer which is secured to one end of said driving frictional member and secured, at its other end, to a stationary body.

10. A driving device according to claim 9, wherein the thickness in the direction along which said moving body engages with said driving frictional member is greater than the thickness of said electromechanical transducer.

11. A driving device according to claim 9, wherein said driving frictional member is kept frictionally-engaged with said moving body, over the entire length thereof.

12. An optical device, comprising:
an electromechanical transducer of which one end is secured to a stationary body;
a driving frictional member which is secured to the other end of said electromechanical transducer;
a moving body which can frictionally engage with said driving frictional member such that it extends beyond the lengthwise end portions of said driving frictional member, said moving body having a length smaller than the total length of the stationary body, said electromechanical transducer and said driving frictional member; and
a barrel which is movable integrally with said moving body while holding an optical component.

13. An optical device according to claim 12, wherein said moving body includes a spring for sandwiching said driving frictional member with an elastic force.

14. An optical device, comprising:
a moving body having frictional surfaces with a length greater than the distance by which it is movable;
a barrel which is movable integrally with said moving body while holding an optical component;
a driving frictional member which frictionally engages with a portion of the frictional surfaces wherein a length of the moving body along a direction of movement of the moving body is greater than a length of the driving frictional member; and
an electromechanical transducer which is secured to one end of said driving frictional member.

15. A driving device according to claim 1, wherein said moving body is moveable with said driving frictional member in at least a first direction, and wherein said driving frictional member is slideable relative to said moving body in at least a second direction opposite the first direction.

16. A driving device according to claim 15, wherein said moving body is free of any movement in said second direction as said driving frictional member moves in said second direction while sliding relative to the moving body.

17. A driving device according to claim 12, wherein said moving body is moveable with said driving frictional member in at least a first direction, and wherein said driving frictional member is slideable relative to said moving body in at least a second direction opposite the first direction.

18. A driving device according to claim 17, wherein said moving body is free of any movement in said second direction as said driving frictional member moves in said second direction while sliding relative to the moving body.

19. A driving device according to claim 14, wherein said moving body is moveable with said driving frictional member in at least a first direction, and wherein said driving frictional member is slideable relative to said moving body in at least a second direction opposite the first direction.

20. A driving device according to claim 19, wherein said moving body is free of any movement in said second direction as said driving frictional member moves in said second direction while sliding relative to the moving body.

* * * * *

UNITED STATES PATENT AND TRADEMARK OFFICE
CERTIFICATE OF CORRECTION

PATENT NO. : 7,268,465 B2 Page 1 of 1
APPLICATION NO. : 11/269946
DATED : September 11, 2007
INVENTOR(S) : Yasuhiro Okamoto It is certified that error appears in the above-identified patent and that said Letters Patent is hereby corrected as shown below:

In the Claims

Column 8, in claim 6, line 2, after "member is made" insert --of--.

Signed and Sealed this

Eighteenth Day of December, 2007

JON W. DUDAS
*Director of the United States Patent and Trademark Office*